March 31, 1959
D. S. SAXMAN
2,879,973
PERCUSSION DRILL BIT
Filed Sept. 17, 1956
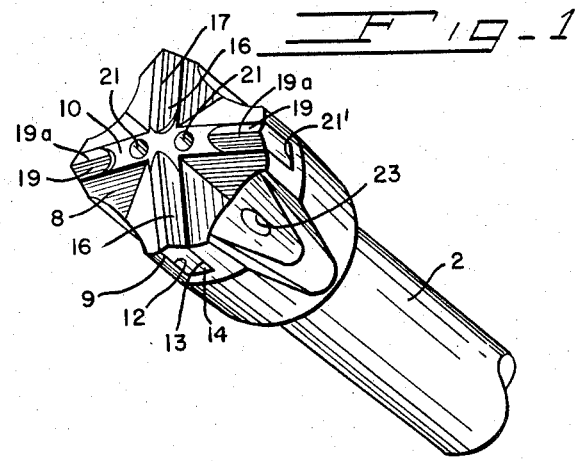
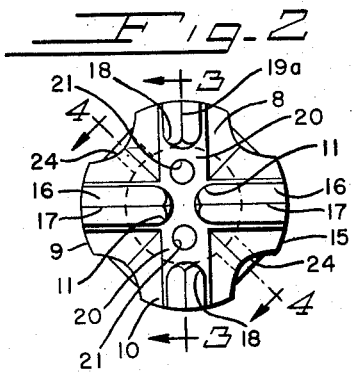
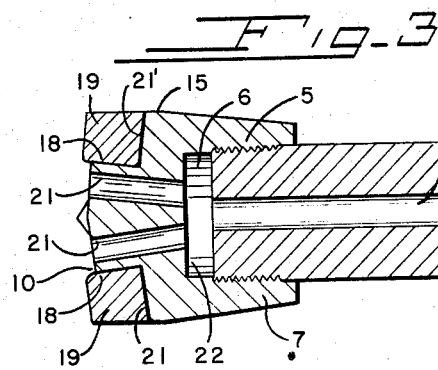
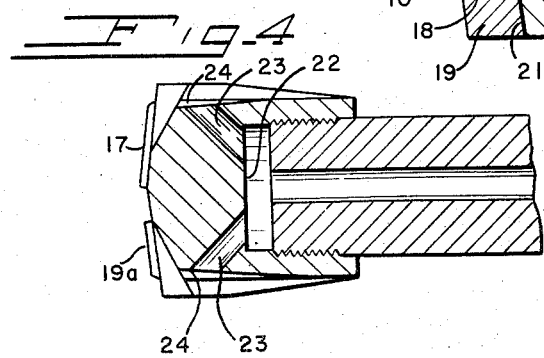
INVENTOR.
DUANE. S. SAXMAN
BY DES JARDINS & ROBINSON
HIS ATTORNEYS United States Patent Office 2,879,973
Patented Mar. 31, 1959

2,879,973

PERCUSSION DRILL BIT

Duane S. Saxman, Bedford, Pa., assignor to Kennametal Inc., Latrobe, Pa., a corporation of Pennsylvania Application September 17, 1956, Serial No. 610,264

14 Claims. (Cl. 255—64)

This invention relates to a percussion drill bit, and more particularly to one having four cutting inserts mounted in a head support with two of them diametrically opposed and each of a length extending in from the side wall of the said head to terminate slightly short of the axis of the drill and with two other inserts also diametrically opposed at an angle to the first two inserts but substantially shorter in length similarly positioned in respect to the side wall of the head to terminate at a greater distance from the axis of the drill in order to avoid unnecessary cutting near the drill center and provide an unobstructed fluid flushing area therefrom outward towards the side wall of the head between said blades.

These cutting inserts are fitted and brazed in slots, each slot having vertical side walls and a bottom wall inclined outwardly and downwardly from the center of the drill head towards its side wall for inclining the cutting edges of the inserts into crowned form rather than having them disposed in an horizontal plane. The inner ends of the cutting inserts are at a lower elevation than the outer ends when the drill is in downward working position, thereby producing a crown shape cutting zone by reason of their inclined position in the drill head rather than specially shaping them to produce the crown shape. Vent holes are provided in the head disposed eccentrically to the center of the drill for more effectively flushing out and clearing away the drill cuttings than with a vent hole centrally located as heretofore. Moreover, the enlarged space at and around the center of the drill, resulting from the spaced inner ends of the longer inserts and the shorter length inserts, is unobstructed and open to the flow of fluid from the vent holes out between the inserts.

Construction of these percussion drills heretofore have been with diametrically opposed inserts of equal length with their inner ends terminating adjacent a central vent opening, or, with inserts of unequal length having a longer length insert extending across the center. Such constructions do not provide effective and efficient cutting, and the cuttings are not effectively and efficiently flushed and cleaned out, but become clogged in and peen closed the vent opening.

Maximum wear on the inserts is at their outer ends, next to the side wall of the head, and the wear becomes progressively less towards their inner ends. Accordingly, more of the cutting edges are, in the present invention, disposed where the maximum cutting is done and with less cutting edges disposed where least cutting is done.

Accordingly, one of the principal objects of this invention is a percussion drill which is more efficient in operation and more simple in construction.

Another object of the invention is a four wing drill with two of the diametrically opposed inserts of longer length than are the other two diametrically opposed inserts.

Another object of the invention is to have the inserts mounted in the percussion drill for disposing their inner ends at an elevation to produce a crowned conformation without forming them of special shape.

Another object of the invention is a percussion drill of a construction to have less cutting inserts near the center and more of them nearer the outside wall of the drill.

Another object of the invention is a percussion drill which is effectively flushed and cleaned by a venting fluid.

Another object of the invention is a percussion drill having vent flushing holes eccentrically disposed.

Still another object of the invention is a percussion drill providing for more uniform wear on the front faces of the cutting inserts, and not wearing pointed, so that less grinding is required in reshaping them.

Further objects, and objects relating to details of construction and economies of operation, will readily appear from the detailed description to follow. In one instance, I have accomplished the objects of my invention by the device and means set forth in the following specification. The invention is clearly defined and pointed out in the appended claims. A structure constituting a preferred embodiment of the invention is illustrated in the accompanying drawings, forming a part of this invention, in which:

Fig. 1 is a perspective view of a percussion drill bit embodying the invention.

Fig. 2 is a plan view of the working face of the drill bit.

Fig. 3 is one cross sectional view of the drill bit on line 3—3 of Fig. 2 looking in the direction of the arrows.

Fig. 4 is another cross sectional view of the drill bit on line 4—4 of Fig. 2 looking in the direction of the arrows.

Referring specifically to the drawings in which like numerals designate like parts, numeral 2 is a conventional drill rod with a longitudinal passage 4 extending therethrough for feeding a fluid to the drill to flush out the drill cuttings. The end of the drill rod is threaded at 5 for being screwed into the socket 6 of a steel drill head 7 which is interiorly threaded to receive the threads 5 on the end of the drill rod.

The head 7 is provided with cut out corner portions 8 between wings 9 and 10 intersecting through the center at right angles, forming a cross. The opposite ends of wing 9 are channeled to provide slots 11 having opposite vertical side walls 12 and 13 and a bottom wall 14 which is inclined outwardly and downwardly from the center towards the side wall 15 of the head 7. A cutting insert 16 of hard cemented tungsten carbide is inserted in each of these two slots 11. These two slots 11 are of a length extending from the peripheral side wall 15 of the head to the opposite sides of wing 10, and an elongated insert 16, having a main portion polygonal in cross section and longitudinally edged at the top, fits within each of the slots 11, with their cutting edges 17 exposed above the top of side walls of the slots. By reason of the inclination of the bottoms 14 of the slots 11 outwardly and downwardly from the center, the inserts will be so inclined rather than in a horizontal plane. This gives a crown conformation to the working surface of the cutting edges 17 of the inserts. Inserts 16 may be referred to as the longer ones.

A shorter slot 18 is formed in the opposite ends of the wing 10 for seating therein two hard metal carbide inserts 19, each having a cutting edge 19a, these being diametrically opposed as are the longer inserts 16. With the inner ends of the two slots 11 in the wing 9 terminating adjacent the opposite sides of the wing 10 and the inner ends of the slots 18 spaced apart, there is a resulting intermediate portion of the wing 10, between the inserts 19 in slots 18, forming an elongated projection from the working face of the head. The bottom 21' of slots 18 are outwardly and downwardly inclined at the same angle as are the bottoms 14 of the longer slots 11. By reason of the shorter length inserts 19, there is a substantial space 20 left between their inner ends which is free from any obstruction between said space 20 and the cut out corner portions 8 for the purpose hereinafter described. This space 20 is unobstructed by the longer inserts 16 whose inner ends terminate at the sides of wing 10. The shorter inserts 19 are about one-half the length of the longer ones 16.

The inner ends of the inserts do not have as much work to do as do their outer ends. Therefore, by reducing the length of two of the diametrically opposed inserts, the shorter ones will function as reamers for the area of the drilled hole. With the pairs of inserts of unequal length, there is less contact of total length of striking edges as compared with the same number of inserts, all of equal length with the longer inserts. With this less length of striking edges, there is greater concentration of force per inch of the lines of cleavage of the rock. Then, as the drill is rotated intermittently by the pneumatic drilling machine, the longer pair of inserts more effectively takes the additional bite out of the rock towards the center space of the drill which is left by the shorter inserts. More cutting edges are provided near the outer ends of the inserts where the work is the greatest, with less cutting edges near the center where the work is the least. The volume of rock acted upon varies as to the square of the distance from the center.

A pair of vent holes 21, eccentric to the center of the drill, are provided through the wing 10 from the top of the head 7 to the bottom 22 of the socket 6 for connecting with the longitudinal passage 4 in the drill rod 2. Another pair of vent holes 23 may be formed through the drill head from the bottom 22 of the socket 6 to two of the diametrically opposed recesses or gaps 24, formed in the peripheral side wall 15 of the head just below each of the cut out corner portions 8. It will be seen that vent holes will be provided around the center of the working surface of the drill and that these connect with the cut out corner portions 8 and recesses or gaps 24. Accordingly, the flow of fluid, water or air, will be directed radially outwardly from around the center of the drill to clear the space 20 between the inner ends of the inserts and wash the drill cuttings out through the recesses or gaps 24 in the side wall of the head. The vent holes 21 and 23 and the space 20 between the inner ends of the inserts are free of any obstruction so as not to impede washing out the drill cuttings. Moreover, all of these vent holes are provided through the head without any sharp angles or turns in which the cuttings can collect, and they are formed through the head remote from those portions of the wings on which the inserts are supported. Hence the support for the inserts is not in any way impaired by the vent holes. While two side vent holes 23 are shown, one will suffice and is even more efficient than two diametrically opposed ones since the force of the flow through the one will counteract the force of the flow from the other.

It will be seen from the description of this novel construction that reduction in length of some of the inserts not only effects a material saving in the amount of carbide metal, which is relatively expensive, but more effective results are obtained with the use of the lesser amount of material. Of even greater importance than the saving of tungsten carbide material is in having more uniform wear over the front faces of the inserts so that regrinding is simpler and less frequent. Conventional inserts tend to wear more on their outside ends than on their inner ends nearer center, thereby becoming pointed and requiring excessive grinding on their pointed inner ends for reshaping. These pointed inner ends must be ground down in reshaping even though not worn dull as are the outer ends.

All of the carbide inserts have exposed faces converging to radial cutting edges and the outer ends of the inserts are tangent to a circle having its center on the axis of the cutting face, the diameter of said circle being substantially that of the bore to be formed. The material near the periphery of the bottom of the bore hole is acted upon by four cutting edges and that nearer the center is acted upon by but two cutting edges, and these shorter cutting edges will function as reamers for the drilled hole. The drill cutting is more effective with the greater number of cutting edges disposed where the most cutting is to be done, and the cuttings are more effectively removed from the drill by having less cutting edges near the center to leave an unobstructed flushing space.

I am aware that there may be various changes in details of construction without departing from the spirit of my invention, and, therefore, I claim my invention broadly as indicated by the appended claims.

Having thus described my invention, what I claim as new and useful and desire to secure by United States Letters Patent, is:

1. A percussion drill bit comprising the combination of a head adapted to be secured to a tubular rod and having an internal chamber in communication with the central passage of the drill rod, and a working face having a pair of diametrically opposite long slots formed therein extending from the periphery radially inward to points adjacent the center of the working face and a pair of diametrically opposite short slots formed therein on a diameter normal to that of the long slots and extending from the periphery radially inward about halfway to the center of the face, a pair of long cutting inserts of cemented hard carbide composition secured in said long slots with their inner ends slightly terminating short of the axis of said head to provide a space therebetween, and a pair of short cutting inserts of cemented hard carbide composition secured in said short slots with their inner ends spaced from said axis at a greater distance than the inner ends of the long inserts to provide a wider space therebetween, all of said carbide inserts having exposed faces converging to radial cutting edges and the outer ends of said inserts being tangent to a circle having its center on the axis of the cutting face, the diameter of said circle being substantially that of the bore to be formed, the head having an elongated projection from the working face extending between the inner ends of the shorter inserts, whereby the material near the periphery of the bottom of the bore hole is acted upon by four cutting edges and that nearer the center is acted on by but two cutting edges.

2. The percussion drill bit of claim 1 in which the bottoms of said slots and the cutting edges of said inserts are inclined upwardly and inwardly at a slight angle to a plane perpendicular to the axis of the head.

3. The percussion drill bit of claim 1 in which vent passages are provided in the head connecting with said internal chamber and opening through said elongated projection of the head about midway between the center and the inner ends of the short inserts.

4. A percussion drill bit comprising a head having a working face in which inserts are mounted, said working face being provided with a plurality of radially disposed diametric wings separated by reduced corner portions for elevating said wings on the working face of the head, diametrically opposed inserts mounted on one wing, extending inwardly from the peripheral outside wall of the head towards the center and terminating short thereof to provide a space between their inner ends, two other diametrically opposed inserts of shorter length than the first two inserts mounted on another wing, also extending inwardly from the peripheral outside wall of the head with their inner ends spaced to provide a wider space, and a venting opening provided through the head between the inner end of one of the shorter inserts and the center of the head.

5. The percussion drill bit of claim 4 in which a vent opening is provided between the center of the head and the inner end of each of the two shorter inserts.

6. The percussion drill bit of claim 4 in which a vent opening is provided through the head to one of the reduced corner portions between the wings.

7. The percussion drill bit of claim 5 in which a vent opening is provided through the head to one of the reduced corner portions between the wings.

8. The percussion drill bit of claim 7 in which the vent opening to one of the reduced corner portions between the wings is through a recess formed in the peripheral outside wall of the head.

9. A percussion drill bit comprising a head having a working face in which inserts are mounted, said working face being provided with a plurality of radially disposed diametric wings separated by reduced corner portions for elevating said wings above the working face of the head, slots formed in the wings having their bottom surfaces inclined outwardly and downwardly towards the outside wall of the head, diametrically opposed inserts mounted in the wing slots and seated on their inclined bottom surfaces with the outer ends of said inserts extending to the outside wall of the head and their inner ends spaced from the center of the head, the diametrically opposed inserts on one wing being shorter in length than the diametrically opposed inserts in another wing for their inner ends to be spaced a greater distance apart, and a vent opening formed through the head between the inner end of one of the shorter inserts and the center of the head.

10. The percussion drill bit of claim 9 in which a vent opening is provided between the center of the head and the inner end of each of the two shorter inserts.

11. The percussion drill bit of claim 9 in which a vent opening is provided through the head to one of the reduced corner portions between the wings.

12. The percussion drill bit of claim 10 in which a vent opening is provided through the head to one of the reduced corner portions between the wings.

13. A percussion drill bit comprising a head having a working face provided with intersecting diametric wings elevated above said working face, thereby forming intervening corner sections between the outer ends of the wings, diametrically opposed inserts fitted into lengthwise slots formed in the wings and extending to the exterior wall of the head from points remote from the center to provide a space between the inner ends of said inserts, said inserts being alternately longer and shorter in length with the consequent wider spacing between the inner ends of the shorter inserts, and a vent opening provided through the head between its center and the inner end of one of the shorter inserts.

14. The percussion drill bit of claim 13 in which the slots in the wings have their bottom surfaces outwardly and downwardly inclined for so inclining the inserts seated on the inclined bottoms of said slots.

References Cited in the file of this patent

FOREIGN PATENTS

| | | |
|---|---|---|
| 530,113 | Great Britain | Dec. 5, 1940 |
| 919,402 | Germany | July 8, 1949 |
| 637,237 | Great Britain | May 17, 1950 |
| 669,615 | Great Britain | Apr. 2, 1952 |